United States Patent
Khayat et al.

(10) Patent No.: US 11,886,718 B2
(45) Date of Patent: *Jan. 30, 2024

(54) DESCRAMBLING OF SCRAMBLED LINEAR CODEWORDS USING NON-LINEAR SCRAMBLERS

(71) Applicant: Micron Technology, Inc., Boise, ID (US)

(72) Inventors: Patrick Robert Khayat, San Diego, CA (US); Sivagnanam Parthasarathy, Carlsbad, CA (US); Mustafa N. Kaynak, San Diego, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,799

(22) Filed: Mar. 1, 2022

(65) Prior Publication Data

US 2022/0253224 A1     Aug. 11, 2022

Related U.S. Application Data

(63) Continuation of application No. 17/005,049, filed on Aug. 27, 2020, now Pat. No. 11,275,515.

(51) Int. Cl.
*G06F 3/06* (2006.01)
*G06F 9/30* (2018.01)

(52) U.S. Cl.
CPC ......... *G06F 3/0623* (2013.01); *G06F 3/0619* (2013.01); *G06F 3/0629* (2013.01); *G06F 3/0659* (2013.01); *G06F 3/0679* (2013.01); *G06F 9/30029* (2013.01)

(58) Field of Classification Search
CPC .... G06F 3/0623; G06F 3/0619; G06F 3/0629; G06F 3/0659; G06F 3/0679; G06F 9/30029; G06F 9/2178; G06F 9/64
See application file for complete search history.

(56) References Cited

U.S. PATENT DOCUMENTS

| | | | |
|---|---|---|---|
| 4,646,147 A | 2/1987 | Kruger | |
| 9,165,599 B1 * | 10/2015 | Oberg | G11B 20/10351 |
| 9,857,911 B1 | 1/2018 | Qu et al. | |
| 11,275,515 B1 | 3/2022 | Khayat et al. | |
| 2003/0226025 A1 | 12/2003 | Lin et al. | |
| 2009/0316490 A1 * | 12/2009 | Takada | G11C 16/10 365/185.26 |

(Continued)

*Primary Examiner* — Hiep T Nguyen
(74) *Attorney, Agent, or Firm* — Greenberg Traurig

(57) ABSTRACT

A memory device configured to descramble scrambled composite data. In one approach, the scrambled composite data is provided by an XOR (exclusive OR operation) of more than one data set scrambled with non-linear scramblers. A memory device is configured to receive scramble codes generated by non-linear scramblers and perform an XOR of the scrambled composite data with the scramble codes to remove scrambling from the composite data. In one example, the scrambled data sets are data to be written to a NAND device at more than one bit per cell density (e.g., MLC, TLC, QLC, PLC, etc.). For example, the scrambled data sets may be written to the NAND device in more than one programming pass. In one example, the scrambled composite data is used to read the scrambled data sets that have been written in a first programming pass.

20 Claims, 6 Drawing Sheets

(56) References Cited

U.S. PATENT DOCUMENTS

| | | | |
|---|---|---|---|
| 2012/0008782 A1* | 1/2012 | Furukawa | H04L 9/06 |
| | | | 380/268 |
| 2016/0026808 A1 | 1/2016 | Biskeborn et al. | |
| 2018/0196712 A1 | 7/2018 | Kim | |
| 2018/0308214 A1* | 10/2018 | Ray | G11C 19/00 |
| 2019/0179543 A1 | 6/2019 | Sharon et al. | |
| 2022/0066657 A1 | 3/2022 | Khayat et al. | |

* cited by examiner

US 11,886,718 B2

DESCRAMBLING OF SCRAMBLED LINEAR CODEWORDS USING NON-LINEAR SCRAMBLERS

RELATED APPLICATIONS

The present application is a continuation application of U.S. patent application Ser. No. 17/005,049, filed Aug. 27, 2020, the entire disclosure of which application is hereby incorporated herein by reference.

FIELD OF THE TECHNOLOGY

At least some embodiments disclosed herein relate to memory systems in general, and more particularly, but not limited to memory systems configured to descramble an XOR of scrambled linear codewords using non-linear scramblers.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices. Data stored in the memory devices may be scrambled. Scrambling data stored in the memory devices may improve data integrity.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a memory sub-system configured to write data to memory using descrambled composite data. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system. Data to be stored in the memory subsystem is sometimes divided into logical subsets of data before being stored. The subsets of data are often scrambled before being written to memory to improve data integrity. The scrambled subsets of data may be written to the memory sub-system in more than one pass (e.g., a coarse writing pass followed by one or more fine writing passes). When writing the data in more than one pass, it can be useful to generate an intermediate form of the data (composite data). The composite data is used to assist in writing the subsets of data in the second writing pass.

When data written into the memory sub-system is scrambled, it can be scrambled by linear scramblers or non-linear scramblers. Non-linear scramblers tend to have better scramble properties. Composite data may also be scrambled. Scrambled data generated with a linear scrambler can be descrambled by performing the scramble operation a second time using the same scramble key (seed). However, composite data generated with non-linear scramblers cannot be descrambled by performing the scramble operation again with a scramble seed.

At least some aspects of the present disclosure address the above and other deficiencies by using a novel method of descrambling scrambled composite data generated from data scrambled with non-linear scramblers. This can provide scrambling data using non-linear scramblers for better scramble performance, and can provide descrambling scrambled composite data created from the data scrambled with non-linear scramblers.

For example, the scrambled composite data can be descrambled by performing an XOR (sometimes referred to as an exclusive OR operation) of the scrambled composite data and scramble codes used to generate the scrambled data that was created with non-linear scramblers. Descrambling and decoding the scrambled composite data enables verifying the integrity of the composite data. In one example, the memory sub-system is a NAND flash memory sub-system.

Figure 1:
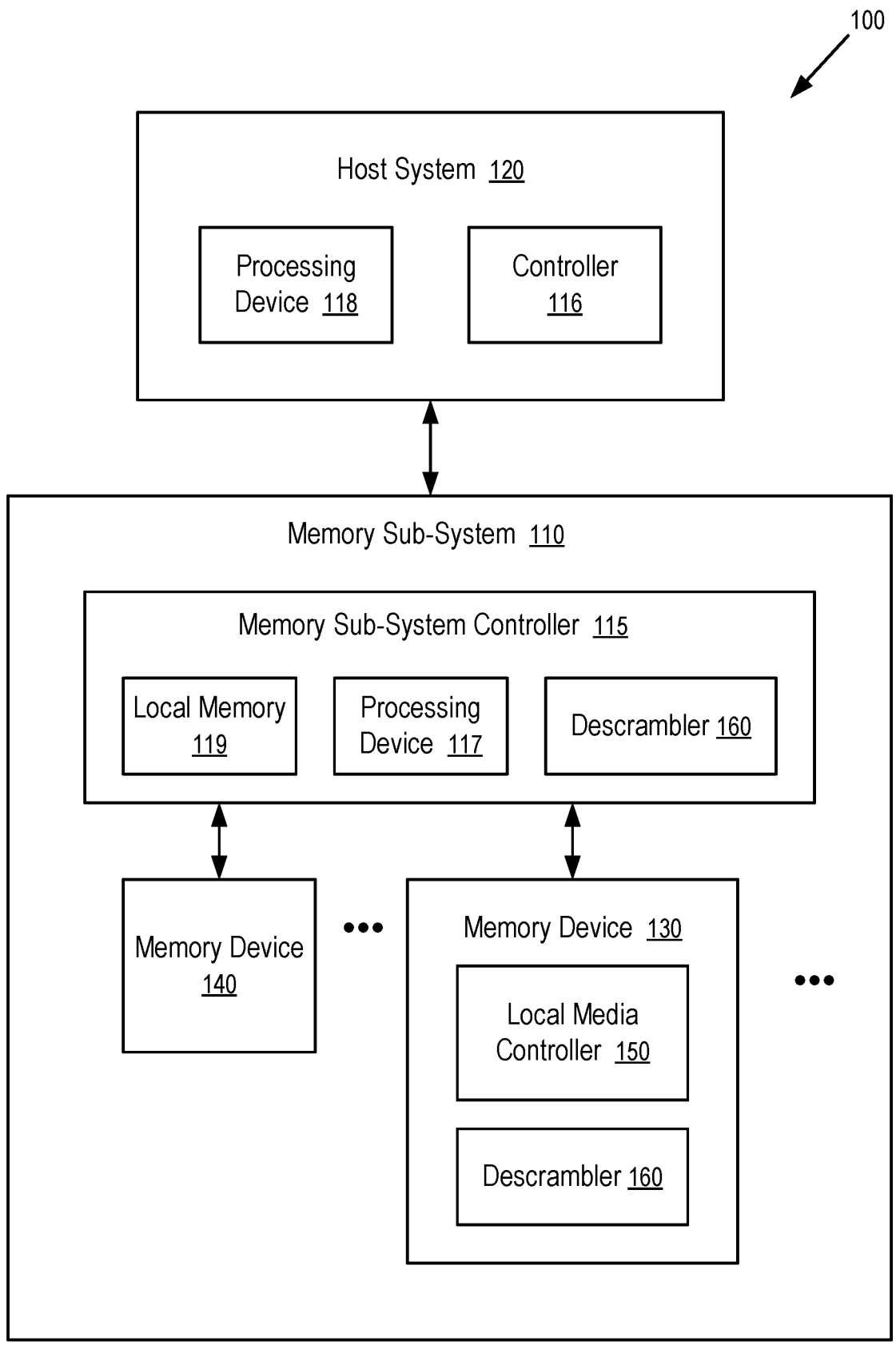
FIG. 1 illustrates an example computing system having a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 150) for media management within the same memory device package. An example of a managed memory device is a managed NAND (MNAND) device.

The controller 115 and/or memory device 130 can include descrambler 160 configured to descramble scrambled composite data created from data scrambled with non-linear scramblers. In some embodiments, the controller 115 in the memory sub-system 110 includes descrambler 160. In one example, all functions of descrambler 160 are implemented in memory sub-system controller 115. In some embodiments, the controller 115 includes at least a portion of descrambler 160. In other embodiments, or in combination, the controller 116 and/or the processing device 118 in the host system 120 includes at least a portion of descrambler 160. For example, the controller 115, the controller 116, and/or the processing device 118 can include logic circuitry implementing descrambler 160. For example, the controller 115, or the processing device 118 (processor) of the host system 120, can be configured to execute instructions stored in memory for performing the operations of descrambler 160 described herein. In some embodiments, descrambler 160 is implemented in an integrated circuit chip disposed in the memory sub-system 110. In other embodiments, descrambler 160 can be part of firmware of the memory sub-system 110, an operating system of the host system 120, a device driver, or an application, or any combination therein.

For example, descrambler 160 implemented in memory device 130 can descramble scrambled composite data created from data scrambled with non-linear scramblers. The scrambled composite data, for example, can be descrambled by performing an XOR of the scrambled composite data and scramble codes used to generate the scrambled data created with non-linear scramblers.

Figure 2:
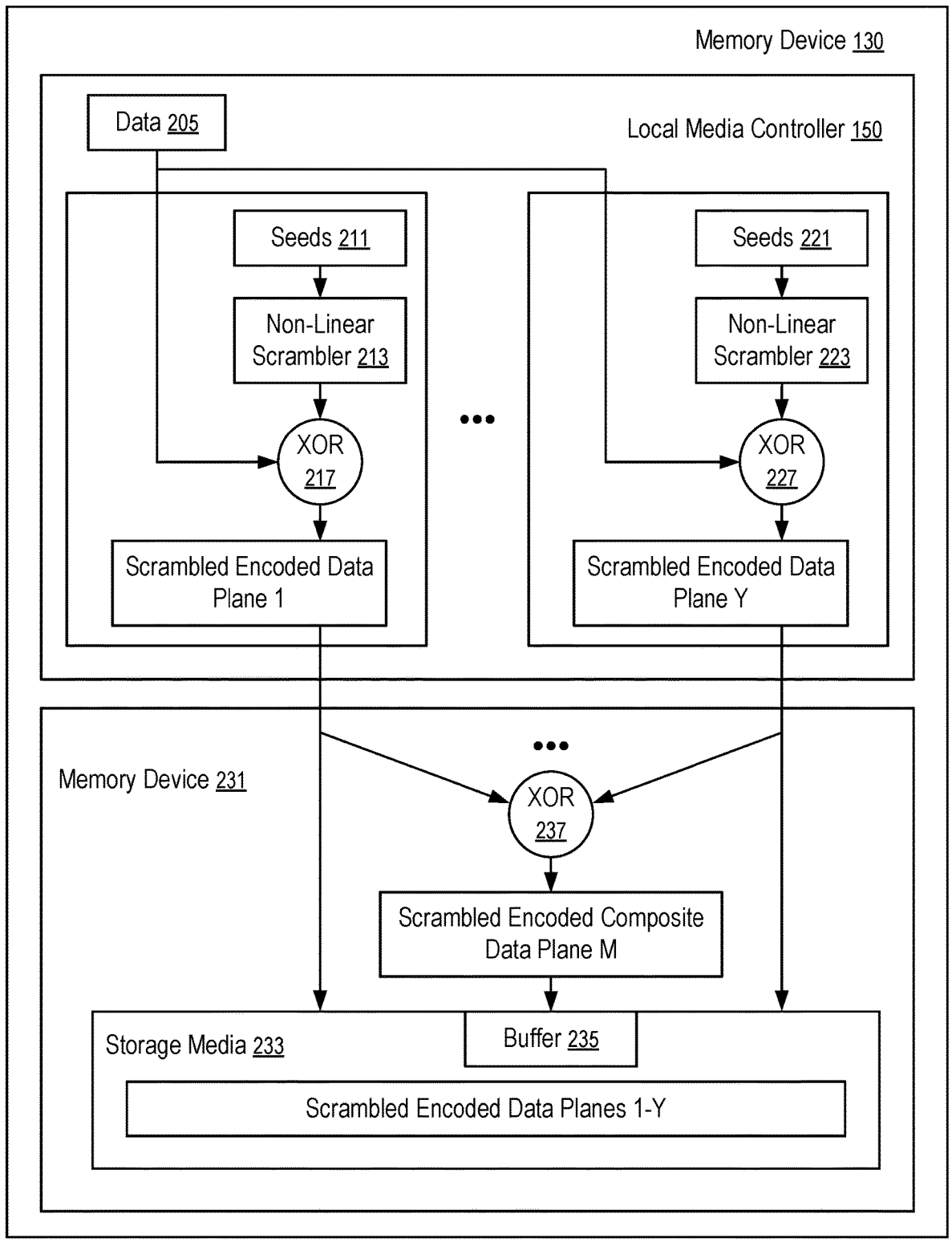
FIG. 2 shows a memory device configured to scramble encoded data with non-linear scramblers and generate scrambled encoded composite data that is an XOR of the non-linear scrambled encoded data according to one embodiment.

FIG. 2 shows a memory device configured to scramble encoded data with non-linear scramblers and generate scrambled encoded composite data that is an XOR of the non-linear scrambled encoded data according to one embodiment.

In one embodiment, a memory device 130 includes local media controller 150. Local media controller 150 may be, for example, an embedded processor, embedded controller, microcontroller, central processing unit (CPU), processing core, execution unit, or other processing device.

In one embodiment, memory device 130 includes memory device 231. In one example, memory device 231 is a NAND flash memory device. Memory device 231 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, memory device 231 can include one or more arrays of memory cells such as SLCs, MLCs, TLCs, QLCs, PLCs, or any combination of such. In some embodiments, memory device 231 can include an SLC portion, an MLC portion, a TLC portion, a QLC portion, and/or a PLC portion of memory cells. The memory cells of memory device 231 may be grouped as pages that can refer to a logical unit of the memory device used to store data. Data stored in memory cells that store multiple bits per cell may also be logically grouped as planes (e.g., logical sets of data). In this context, a plane of data is a group of data bits where each memory cell provides one bit of data to the plane. For example, a QLC memory cell with four bits of data provides one bit of data to each of four planes (e.g., lower, upper, extra, and top planes).

In one embodiment, memory device 130 receives data (e.g., data 205) to be written to memory device 231. Data 205 may be, for example, data received as part of a write command from host system 120 or may be part of an internal write operation of memory device 231 (e.g., moving data internally for wear leveling).

In one example, data 205 is encoded, for example, for data integrity parity checking. In one example, data 205 is encoded with Low-Density Parity Check (LDPC) data. LDPC is a linear error-correcting block code. In one example, data 205 is encoded by processing device 118 in host system 120. In another example, encoders may be included in memory sub-system controller 115 and encode data 205. In one example, one or more encoders are included in local media controller 150 and used to encode data 205.

In one example, data 205 is logically partitioned into planes (e.g., logical sets of data as described above), and each plane is logically partitioned into codewords (e.g., each plane may be subdivided into 16-bit codewords). In one example, the planes are pages of data. In one example, the planes are blocks of data.

In one embodiment, encoded data is scrambled by performing an XOR (e.g., XOR 217-227) of the encoded data with scramble codes. Scramblers (e.g., non-linear scramblers 213-223) receive seeds (e.g., seeds 211-221) and generate the scramble codes used to scramble the encoded data. In one example, non-linear scramblers 213-223 perform a hash function to generate the scramble codes. The output from XOR 217-227 is scrambled encoded data planes 1-Y.

In some embodiments, a scrambled encoded composite data plane (e.g., scrambled encoded composite data plane M) is provided by performing an XOR (e.g., XOR 237) of each of the scrambled encoded data planes (e.g., scrambled encoded data plane 1 XOR scrambled encoded data plane 2 XOR . . . scrambled encoded data plane Y). In one embodiment, scrambled encoded composite data plane M is generated by memory device 231. In one embodiment, scrambled encoded composite data plane M is generated by local media controller 150. In one example, data derived from scrambled encoded composite data plane M is used to read scrambled encoded data planes 1-Y.

In one embodiment, scrambled encoded data planes 1-Y are written in a first programming pass to a storage media (e.g., storage media 233) of memory device 231. In one example, the first programming pass is an initial coarse programming pass. In one example, storage media 233 stores scrambled encoded data planes 1-Y in a mode using multiple bits per cell (e.g., MLC, TLC, QLC, PLC, etc.). Scrambled encoded composite data plane M is written to a buffer (e.g., buffer 235). In one embodiment, buffer 235 is part of storage media 233. In one embodiment, buffer 235 is external to storage media 233. In one example, scrambled encoded composite data plane M is stored in buffer 235 in an SLC mode. In one example, scrambled encoded composite data plane M is stored in buffer 235 until the completion of writing scrambled encoded data planes 1-Y to storage media 233.

Figure 3:
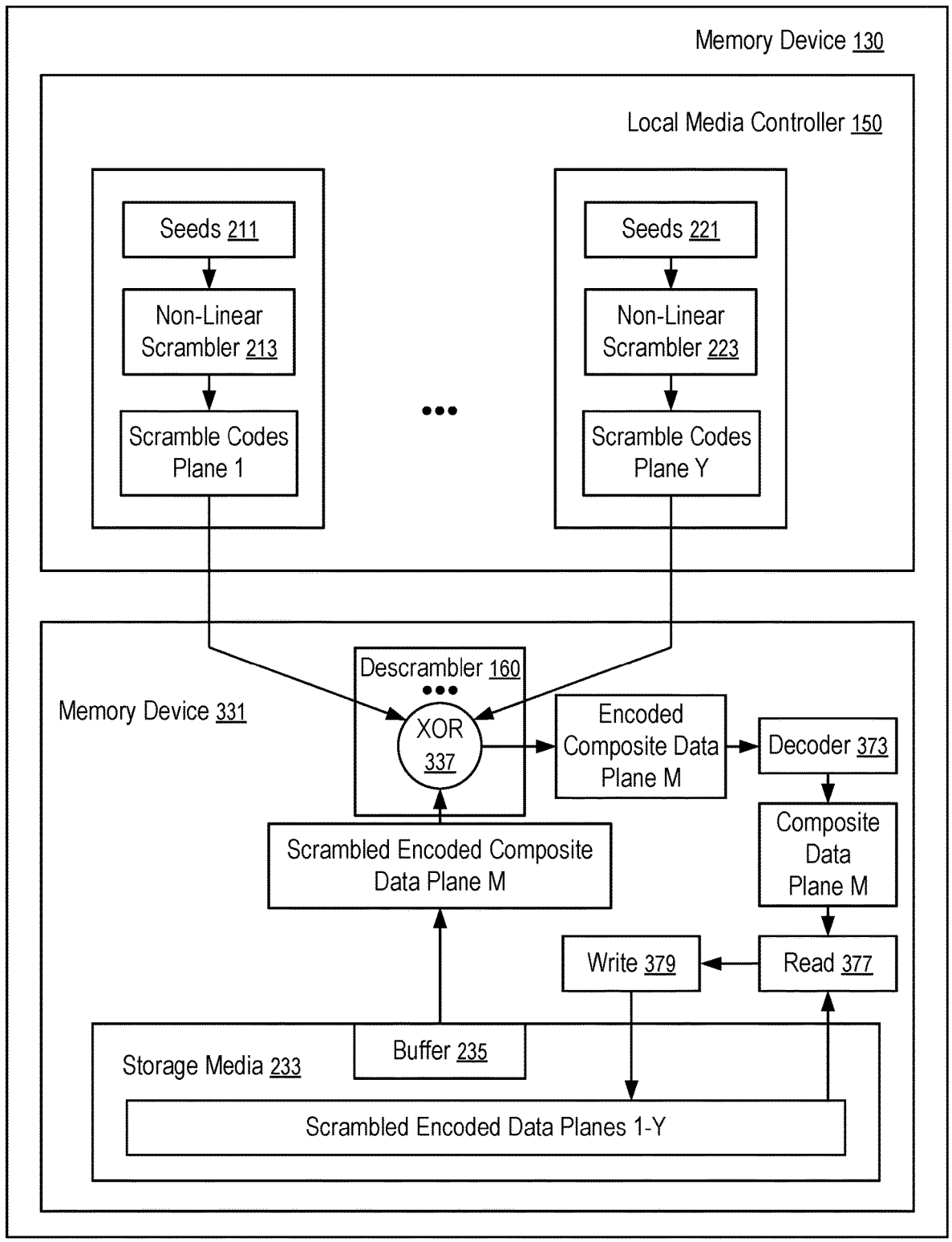
FIG. 3 shows a memory device configured to descramble non-linear scrambled encoded composite data within a memory device according to one embodiment.

FIG. 3 shows a memory device configured to descramble non-linear scrambled encoded composite data within the memory device according to one embodiment. In one example, scrambled encoded data planes 1-Y that were written to storage media 233 in a first programming pass are read. Scrambled encoded composite data plane M is read from buffer 235, descrambled, decoded, and used to assist in reading scrambled encoded data planes 1-Y. Scrambled encoded data planes 1-Y are then written to storage media 233 in a second programming pass.

In one embodiment, memory device 130 includes a memory device (e.g., memory device 331). In one example, memory device 331 is memory device 231 of FIG. 2. In one embodiment, memory device 331 includes descrambler 160. Descrambler 160 descrambles scrambled encoded composite data plane M read from buffer 235 to provide encoded composite data plane M.

Descrambler 160 descrambles scrambled encoded composite data plane M by performing an XOR (e.g., XOR 337) of scrambled encoded composite data plane M with scramble codes matching the scramble codes used to generate scrambled encoded data planes 1-Y (e.g., scrambled encoded composite data plane M XOR scramble codes plane 1 XOR scramble codes plane 2 . . . XOR scramble codes plane Y). Performing XOR 337 on scrambled encoded composite data plane M using scramble codes matching the scramble codes used to generate non-linear scrambled encoded data planes 1-Y removes scrambling from scrambled encoded composite data plane M.

In one example, host system 120 includes the scramblers, and controller 116 sends the scramble codes to memory sub-system controller 115. In one example, memory sub-system 110 includes the scramblers, and memory sub-system controller 115 is configured to generate the scramble codes and to descramble scrambled encoded composite data plane M. In one example, memory sub-system controller 115 is configured to send the scramble codes to local media controller 150; local media controller 150 is configured to descramble scrambled encoded composite data plane M and to write scrambled encoded data planes 1-Y to storage media 233 in the first and second programming passes. In one example, local media controller 150 includes multiple scramblers configured to generate scramble codes planes 1-Y in parallel operations. In one example, multiple scramblers are used in parallel, and all XOR operations are performed in memory sub-system 110.

In one example, descrambler 160 receives scramble codes planes 1-Y from local media controller 150. Local media controller 150 generates the scramble codes by using seeds 211-221 and performing scramble functions by non-linear scramblers 213-223 to reproduce the same scramble codes used to scramble scrambled encoded data planes 1-Y. In one example, each scramble code is associated with scrambled data for a plane (e.g., planes 1-Y), and the scramble codes are generated for the scrambled data of each plane.

In one example, memory device 130 descrambles scrambled encoded composite data plane M by using a register of memory device 130 to perform a series of XOR operations using scramble codes planes 1-Y to remove scramble components from scrambled encoded composite data plane M.

In one embodiment, memory device 331 includes non-linear scramblers 213-223 and generates scramble codes planes 1-Y given seeds 211-221. In this embodiment the scramble codes are generated internal to memory device 331, and scrambled encoded composite data plane M can be descrambled as it is read out of buffer 235.

In one embodiment, encoded composite data plane M is received by a decoder (e.g., decoder 373). Decoder 373 decodes encoded composite data plane M to provide composite data plane M. In one example, data corruption errors that may have been introduced into scrambled encoded composite data plane M are corrected after encoded composite data plane M is decoded to provide composite data plane M. In one example, decoder 373 applies LDPC error correction to produce composite data plane M.

Scrambled encoded data planes 1-Y are read (e.g., read 377) from storage media 233. In one example, scrambled encoded data planes 1-Y that were written in the first programming pass are read 377 from storage media 233. In one embodiment, composite data plane M is used to assist in reading 377 scrambled encoded data planes 1-Y. In one example, composite data plane M is used to separate data being read so that adjacent data values are read in different read passes. Separating reads from adjacent data values may improve read accuracy. In one example, an error rate of scrambled encoded data planes 1-Y written in the first programming pass is greater than the error rate of scrambled encoded data planes 1-Y written in the second programming pass. In one example, local media controller 150 is configured to read, using the descrambled composite data, scrambled encoded data planes 1-Y written in the first programming pass. In one example, the descrambled composite data is used to provide improved margins when reading data programmed in a first pass in order to prevent errors from propagating into a second programming pass. In one example, composite data plane M is used to minimize the extent of errors when reading data from the first programming pass. For example, composite data plane M is used to indicate which cells in a storage media belong to specific grouped level distributions with sufficient window (e.g., separation between levels) to minimize read bit errors.

In one embodiment, scrambled encoded data planes 1-Y are written (e.g., write 379) to storage media 233 in one or more second programming passes. In one example, write 379 is a fine programming pass. In one example, scrambled encoded data planes 1-Y are written in a second programming pass to storage media 233 at greater than one bit per cell density (e.g., MLC, TLC, QLC, PLC, etc.).

Figure 4:
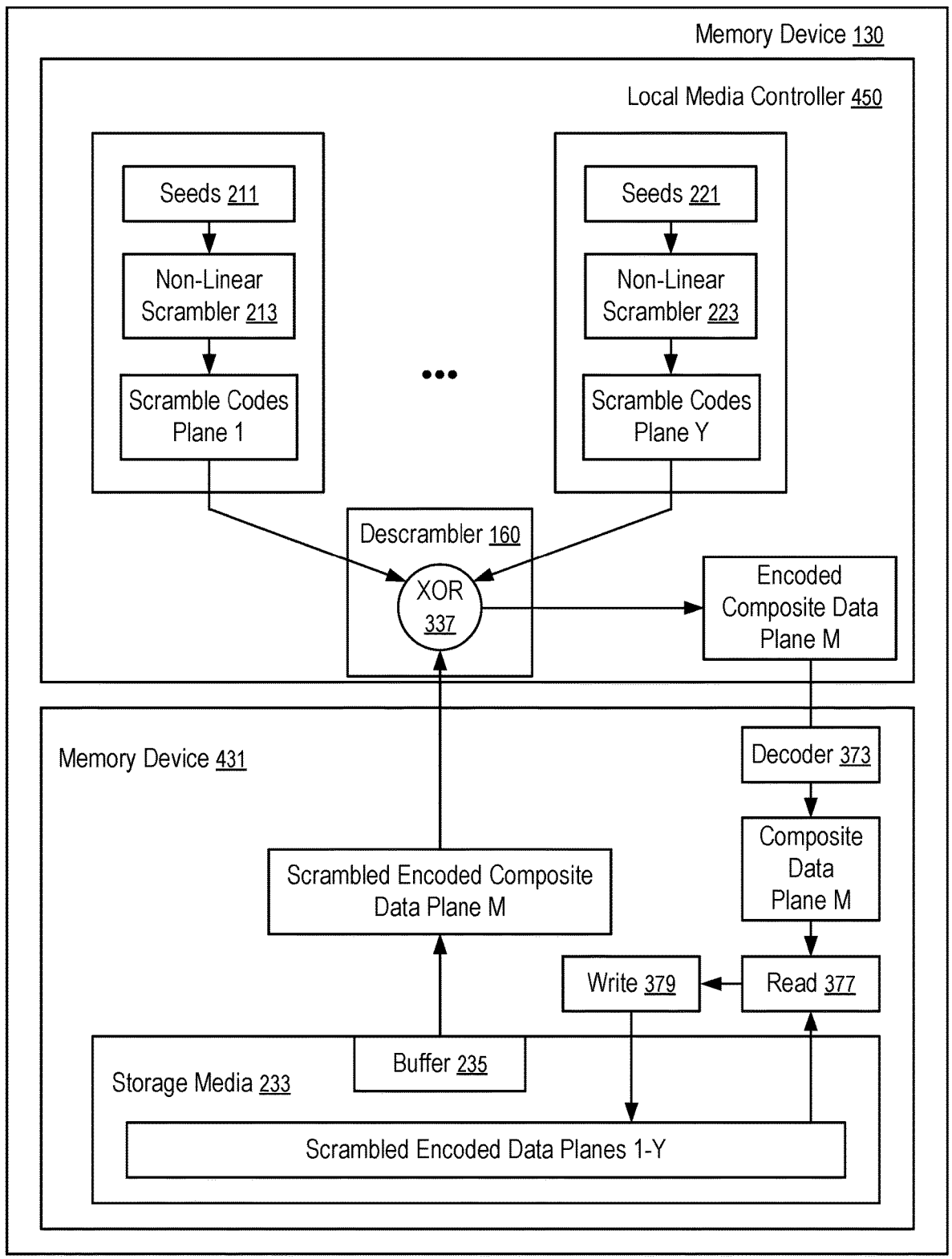
FIG. 4 shows a memory device configured to descramble non-linear scrambled encoded composite data within a controller according to one embodiment.

FIG. 4 shows a memory device configured to descramble non-linear scrambled encoded composite data within a controller according to one embodiment.

In one embodiment, memory device 130 includes a memory device (e.g., memory device 431) and local media controller (e.g., local media controller 450). In one example, memory device 431 is memory device 231 of FIG. 2 or memory device 331 of FIG. 3. In one example, local media controller 450 is local media controller 150 of FIGS. 2 and 3.

In one embodiment, local media controller 450 includes descrambler 160. In one example, scrambled encoded composite data plane M is read from buffer 235 and sent to local media controller 450. Local media controller 450 generates scramble codes planes 1-Y for use in descrambling scrambled encoded data planes 1-Y. Local media controller 450 descrambles scrambled encoded composite data plane M by performing XOR operations using scramble codes planes 1-Y to remove scramble components from scrambled encoded composite data plane M. Memory device 431 receives the descrambled composite data (e.g., encoded composite data plane M) and decodes encoded composite data plane M to provide descrambled and decoded composite data (e.g., composite data plane M). Composite data plane M is used to read 377 scrambled encoded data planes 1-Y written to storage media 233 in the first programming pass. Scrambled encoded data planes 1-Y are written 379 to storage media 233 in one or more second programming passes.

In one example, scrambled encoded data planes 1-Y are written 379 in a second programming pass to storage media 233 at greater than one bit per cell density (e.g., MLC, TLC, QLC, PLC, etc.).

In one example, the processing capability of local media controller 450 is greater than the processing capability of memory device 431. In one example, memory device 431 is configured as a redundant array of NAND devices.

In one example, local media controller 450 generates the scramble codes by using seeds 211-221 and performing scramble functions by non-linear scramblers 213-223 to reproduce the same scramble codes used to scramble scrambled encoded data planes 1-Y. In one example, non-linear scramblers 213-223 perform a hash function to generate the scramble codes. In one example, each scramble code is associated with scrambled data for a plane (e.g., planes 1-Y), and the scramble codes are generated for the scrambled data of each plane. In one example, local media controller 450 includes multiple scramblers configured to generate scramble codes planes 1-Y in parallel operations.

Figure 5:
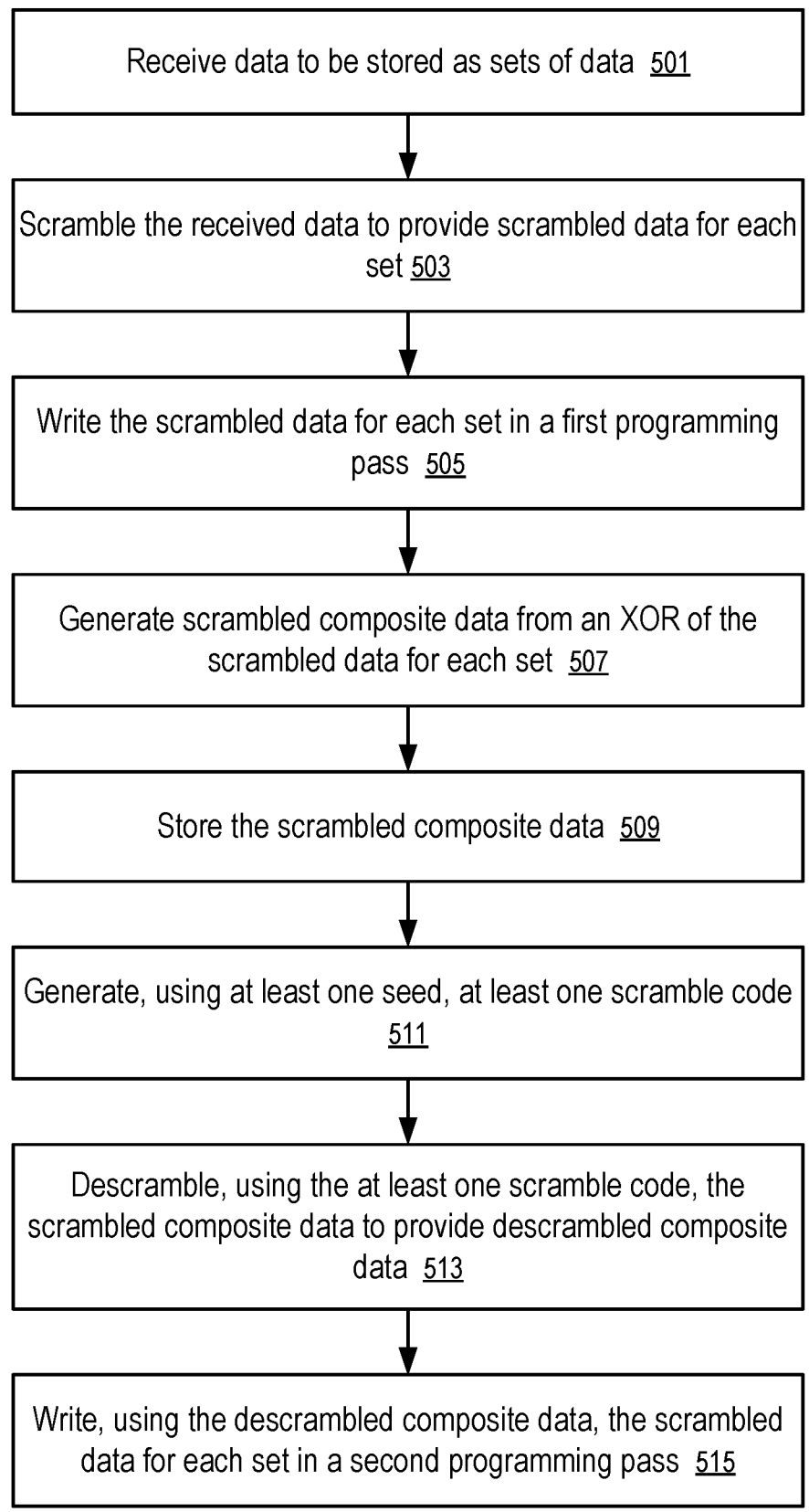
FIG. 5 shows a method to write data using descrambled composite data according to one embodiment.

FIG. 5 shows a method to write data using descrambled composite data according to one embodiment. The method of FIG. 5 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 5 is performed at least in part by memory sub-system controller 115 of FIG. 1, or local media controller 150 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 5 can be implemented in a computing system of FIG. 1 with non-linear scramblers 213-223 illustrated in FIGS. 2-4 and descrambler 160 illustrated in FIGS. 3 and 4.

At block 501, data to be stored as sets of data is received. In one example, data 205 is logically partitioned into sets (e.g., logical data planes—upper, lower, top and extra pages for a QLC device). In one example, the sets of data are encoded (e.g., codewords) generated by encoders (e.g., parity encoders). In one example, the sets of data are not encoded.

At block 503, the received data is scrambled to provide scrambled data for each set. In one example, the scrambled data for each set is scrambled encoded data planes 1-Y.

At block 505, the scrambled data for each set is written in a first programming pass. In one example, scrambled encoded data planes 1-Y are written to storage media 233.

At block 507, scrambled composite data is generated from an XOR of the scrambled data for each set. In one example, XOR 237 of scrambler 239 generates scrambled encoded composite data plane M by performing an XOR of each of the data sets (e.g., scrambled encoded data plane 1 XOR scrambled encoded data plane 2 XOR . . . scrambled encoded data plane Y).

At block 509, the scrambled composite data is stored. In one example, scrambled encoded composite data plane M is stored in buffer 235. In one example, buffer 235 stores data in SLC mode.

At block 511, at least one scramble code is generated using at least one seed. In one example, the at least one scramble code is scramble codes plane 1-Y of FIGS. 3-4. In one example, the at least one seed is seeds 211-221 of FIGS. 3-4.

At block 513, the scrambled composite data is descrambled using the at least one scramble code to provide descrambled composite data. In one example, scrambled encoded composite data plane M is descrambled by performing XOR 337 with scrambled encoded composite data plane M and scramble codes planes 1-Y.

At block 515, the scrambled data for each set is written in a second programming pass using the descrambled composite data. In one example, scrambled encoded data planes 1-Y are read 377 from storage media 233 using composite data plane M, and are written 379 to storage media 233 in a second programming pass.

In one embodiment, a non-transitory computer storage medium can be used to store instructions of the firmware of a memory sub-system (e.g., 110). When the instructions are executed by the controller 115 and/or the processing device 117, the instructions cause the controller 115, the processing device 117, and/or a separate hardware module to perform the methods discussed above.

Figure 6:
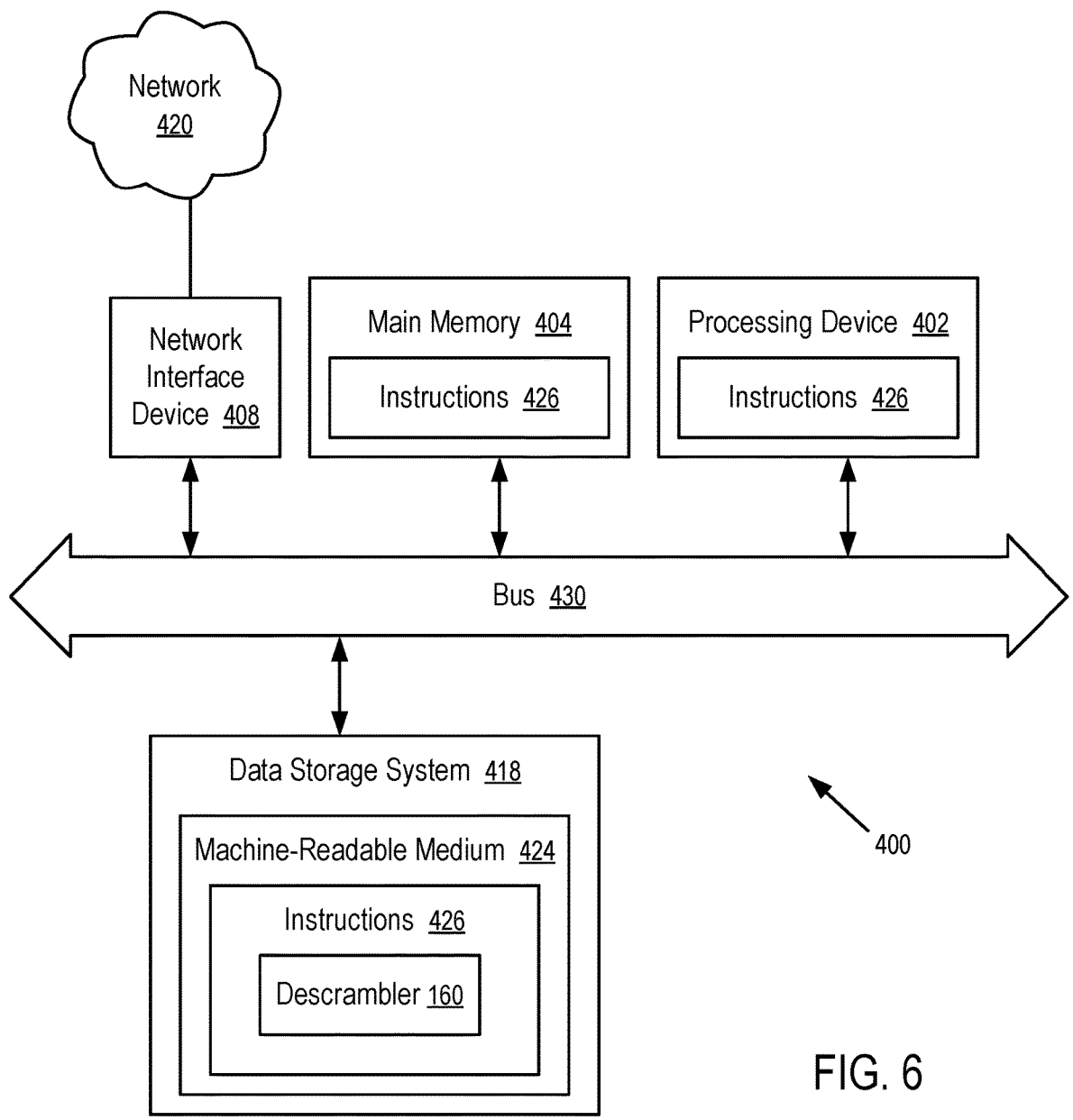
FIG. 6 is a block diagram of an example computer system in which embodiments of the present disclosure can operate.

FIG. 6 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of descrambler 160 (e.g., to execute instructions to perform operations corresponding to descrambler 160 described with reference to FIGS. 1-4). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a descrambler 160 (e.g., the descrambler 160 described with reference to FIGS. 1-4). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In one embodiment, a system includes: at least one storage media (e.g., storage media 233) configured to store data in a plurality of planes; scramblers (e.g., non-linear scramblers 213-223) configured to generate respective scramble codes for each of the planes; and at least one processing device (e.g., local media controller 150) configured to: scramble first data (e.g., data 205) to be stored in the storage media to provide scrambled data for each of the planes; write, in a first programming pass, the scrambled data (e.g., scrambled encoded data planes 1-Y) for each plane to the storage media; generate scrambled composite data (e.g., scrambled encoded composite data plane M) from an XOR (e.g., XOR 237) of the scrambled data for each plane; store the scrambled composite data; generate, by the scramblers and using at least one seed (e.g., seeds 211-221), the scramble codes (e.g., scramble codes planes 1-Y); descramble (e.g., using descrambler 160), using the scramble codes, the scrambled composite data to provide descrambled composite data (e.g., encoded composite data plane M); read, using second data derived from the descrambled composite data, the scrambled data for each plane; and write, in a second programming pass, the scrambled data for each plane to the storage media.

In one embodiment, the system includes a decoder (e.g., decoder 373) configured to decode the descrambled composite data to provide the second data.

In one embodiment, the system includes a logic circuit configured to use the scramble codes (e.g., scramble codes planes 1-Y) as input to an XOR operation (e.g., XOR 337) to remove scramble components from the scrambled composite data and provide the descrambled composite data.

In one embodiment, the system includes a buffer (e.g., buffer 235) configured to store the scrambled composite data until completion of writing the scrambled data in the second programming pass.

In one embodiment, the system includes an encoder configured to receive the first data, and encode (e.g., LDPC parity encode) the first data to provide encoded first data, wherein an XOR (e.g., XOR 217-227) of the encoded first data and scramble codes provides the scrambled data for each plane.

In one embodiment, the system includes: after the first programming pass, the scrambled data for each plane is stored in the storage media in at least one of a multi-level cell (MLC), a triple-level cell (TLC), or a quad-level cell (QLC) mode; and the scrambled composite data is stored in the storage media in a single-level cell mode.

In one embodiment, writing the scrambled data in the second programming pass is based on reading the scrambled data using the descrambled composite data.

In one embodiment, an error rate (e.g., bit error rate (BER)) of the scrambled data when read using the descrambled composite data is lower than an error rate of the scrambled data when read without using the descrambled composite data. In one example, a first pass error rate is an error rate when reading first pass data (e.g., programmed using coarse programming) for use in second pass programming. Reading using the composite data (e.g., composite data plane M) reduces the error rate in first pass data that will be programmed in the second pass programming (e.g., fine programming).

In one embodiment, the at least one processing device includes: a first controller of the host system (e.g., controller 116); and a second controller of a memory sub-system (e.g., memory sub-system controller 115), wherein the first controller sends a write command to the second controller.

In one embodiment, the at least one processing device further includes a third controller of a memory device (e.g., memory device 130), and the third controller is configured to read, using the descrambled composite data, the scrambled data written in the first programming pass.

In one embodiment, the host system (e.g., host system 120) includes the scramblers, and the first controller (e.g., controller 116) is configured to send the scramble codes to the second controller.

In one embodiment, the memory sub-system includes the scramblers; the at least one processing device includes a third controller of a memory device, the third controller is configured to descramble the scrambled composite data, and to write the scrambled data in the first and second programming passes; and the second controller is configured to send the scramble codes to the third controller.

In one embodiment, a method includes: receiving data to be stored as sets of data; scrambling the received data to provide scrambled data for each set; writing the scrambled data for each set in a first programming pass; generating scrambled composite data from an XOR of the scrambled data for each set; storing the scrambled composite data; generating, using at least one seed, at least one scramble code; descrambling, using the at least one scramble code, the scrambled composite data to provide descrambled composite data; reading, using the descrambled composite data, the scrambled data for each set; and writing the scrambled data for each set in a second programming pass.

In one embodiment, each set of data is a plane; the scrambled data for each plane is stored in at least one of a multi-level cell (MLC), a triple-level cell (TLC), or a quad-level cell (QLC) mode; and the scrambled composite data is stored in a single-level cell mode.

In one embodiment, writing the scrambled data in the second programming pass is based on reading the scrambled data written in the first programming pass.

In one embodiment, reading the scrambled data comprises using the descrambled composite data to reduce a rate of read errors when reading the scrambled data written in the first programming pass.

In one embodiment, the method further includes: decoding the descrambled composite data to provide decoded data; wherein writing the scrambled data in the second programming pass is based on reading the scrambled data written in the first programming pass.

In one embodiment, a method includes: receiving data to be written as planes at a greater than one bit per cell density, wherein each plane corresponds to data stored in memory cells and has a single bit of data stored in each memory cell; scrambling data of each plane to provide respective scrambled data for each plane; generating scrambled composite data, wherein the scrambled composite data is provided as a result from an XOR of the scrambled data for each plane; generating scramble codes for use in descrambling the scrambled data of each plane; descrambling the scrambled composite data to provide descrambled composite data; reading, using the descrambled composite data, the scrambled data; and writing the scrambled data for each plane.

In one embodiment, the descrambling includes using the scramble codes to perform XOR operations to remove scramble components from the scrambled composite data.

In one embodiment, reading the scrambled data includes using the descrambled composite data to reduce a rate of read errors.

In one embodiment, a method includes: receiving, by a controller of a memory device, data to be written as planes to the memory device at a greater than one bit per cell density, wherein each plane corresponds to data stored in memory cells of the memory device and has a single bit of data stored in each memory cell; scrambling data of each plane to provide respective scrambled data for each plane; writing the scrambled data for each plane to the memory device in a first programming pass; generating scrambled composite data, wherein the scrambled composite data is provided as a result from an XOR of the scrambled data for each plane; storing, in a buffer of the memory device, the scrambled composite data; reading the scrambled composite data from the buffer; sending, to the controller, the scrambled composite data; generating, by the controller, scramble codes for use in descrambling the scrambled data of each plane; descrambling, by the controller, the scrambled composite data to provide descrambled composite data; receiving, by the memory device from the controller, the descrambled composite data; and reading, using data derived from the descrambled composite data, the scrambled data for each plane of the memory device; writing the scrambled data for each plane to the memory device in a second programming pass.

In one embodiment, the descrambling includes using the scramble codes to perform XOR operations to remove scramble components from the scrambled composite data.

In one embodiment, the scrambled composite data is stored in a single-level cell mode.

In one embodiment, a method includes: receiving, by a controller of a memory device, data to be written as planes to the memory device at a greater than one bit per cell density, wherein each plane corresponds to data stored in memory cells of the memory device and has a single bit of data stored in each memory cell; scrambling data of each plane to provide respective scrambled data for each plane; writing the scrambled data for each plane to the memory device in a first programming pass; generating scrambled composite data, wherein the scrambled composite data is provided as a result from an XOR of the scrambled data for each plane; storing, in a buffer of the memory device, the scrambled composite data; generating, by the memory device using at least one seed, scramble codes; reading the scrambled composite data from the buffer; descrambling, by the memory device using the scramble codes, the scrambled composite data to provide descrambled composite data; and reading, using data derived from the descrambled composite data, the scrambled data for each plane of the memory device; writing the scrambled data for each plane to the memory device in a second programming pass.

In one embodiment, the descrambling includes using the scramble codes to perform XOR operations to remove scramble components from the scrambled composite data.

In one embodiment, a method includes: receiving, by a controller of a memory device, data to be written as planes to the memory device at a greater than one bit per cell density, wherein each plane corresponds to data stored in memory cells of the memory device and has a single bit of data stored in each memory cell; scrambling, by at least one non-linear scrambler of the controller, data of each plane to provide respective scrambled data for each plane; writing, in a first programming pass, the scrambled data for each plane; generating, by the memory device, scrambled composite data, wherein the scrambled composite data is provided as a result from an XOR of the scrambled data for each plane; storing, in a buffer of the memory device, the scrambled composite data, wherein the scrambled composite data is temporarily stored in the buffer until completion of writing the scrambled data for each plane; generating, by the controller, scramble codes for use in descrambling, wherein each scramble code is associated with scrambled data for a plane, and the scramble codes are generated for the scrambled data of each plane; receiving, by the memory device from the controller, the scramble codes; reading the scrambled composite data from the buffer; descrambling, by the memory device using a register of the memory device, the scrambled composite data to provide descrambled composite data, wherein the descrambling includes using the received scramble codes to perform XOR operations in series to remove scramble components from the scrambled composite data; reading, using the descrambled composite data, the scrambled data for each plane; and writing, in a second programming pass, the scrambled data for each plane to the memory device at the greater than one bit per cell density.

In one embodiment, the first programming pass is an initial course programming pass, and the second programming pass is part of one or more fine programming passes.

In one embodiment, the memory device is a NAND flash memory device.

In one embodiment, the scrambled data for each plane is stored in at least one of a multi-level cell (MLC), a triple-level cell (TLC), or a quad-level cell (QLC) mode.

In one embodiment, the controller (e.g., local media controller 150) includes multiple scramblers configured to generate the scramble codes in parallel operations.

In one embodiment, a processing capability of the controller is greater than a processing capability of the memory device.

In one embodiment, a method includes: receiving, by a controller of a memory device, data to be written as planes to the memory device at a greater than one bit per cell density, wherein each plane corresponds to data stored in memory cells of the memory device and has a single bit of data stored in each memory cell; scrambling data of each plane to provide respective scrambled data for each plane; writing, in a first programming pass, the scrambled data for each plane; generating scrambled composite data, wherein the scrambled composite data is provided as a result from an XOR of the scrambled data for each plane; storing, in a buffer of the memory device, the scrambled composite data, wherein the scrambled composite data is temporarily stored in the buffer until completion of writing the scrambled data for each plane; reading the scrambled composite data from the buffer; sending, to the controller, the scrambled composite data; generating, by at least one non-linear scrambler of the controller, scramble codes for use in descrambling, wherein each scramble code is associated with scrambled data for a respective plane of the planes, and each scramble code is generated for the scrambled data of the respective plane; descrambling, by the controller, the scrambled composite data to provide descrambled composite data, wherein the descrambling includes using the scramble codes to perform XOR operations to remove scramble components from the scrambled composite data; receiving, by the memory device from the controller, the descrambled composite data; reading, using data derived from the descrambled composite data, the scrambled data for each plane; and writing, in a second programming pass, the scrambled data for each plane to the memory device at the greater than one bit per cell density.

In one embodiment, the controller (e.g., memory sub-system controller 115) includes multiple scramblers (e.g., one for each plane) configured to generate the scramble codes in parallel operations.

In one embodiment, a processing capability of the controller is greater than a processing capability of the memory device.

In one embodiment, the at least one non-linear scrambler is based on a hash function (e.g., the hash function may include a column address).

In one embodiment, the memory device is configured as a redundant array of NAND devices.

In one embodiment, the scrambled composite data is generated by the controller (e.g., local media controller 150).

In one embodiment, the scrambled composite data is generated by the memory device (e.g., memory device 231).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   at least one storage media; and
   at least one processing device configured to:
      scramble data to be stored in the storage media;
      write the scrambled data to the storage media;
      generate composite data of the scrambled data;
      read, using the composite data, the scrambled data; and
      write the scrambled data to the storage media.

2. The system of claim 1, wherein the scrambled data is stored in the storage media in at least one of a multi-level cell (MLC), a triple-level cell (TLC), or a quad-level cell (QLC) mode.

3. The system of claim 1, wherein the composite data is stored in the storage media in a single-level cell (SLC) mode.

4. The system of claim 1, wherein writing the scrambled data is based on the reading of the scrambled data.

5. The system of claim 1, wherein:
   the scrambled data comprises data for each of a plurality of planes; and
   writing the scrambled data comprises writing data for each plane to the storage media.

6. The system of claim 1, further comprising scramblers configured to generate scramble codes, wherein:
   the generated composite data is scrambled;
   the processing device is further configured to descramble, using the scramble codes, the generated composite data to provide descrambled composite data; and
   the descrambled composite data is used to read the scrambled data.

7. The system of claim 6, wherein the scramble codes are generated by the scramblers using at least one seed.

8. The system of claim 6, further comprising a logic circuit configured to use the scramble codes as an input to an XOR operation to remove scramble components from the generated composite data prior to reading the scrambled data.

9. The system of claim 1, further comprising a buffer configured to store the generated composite data until completion of writing the scrambled data.

10. The system of claim 1, further comprising:
    an encoder; and
    scramblers configured to generate scramble codes;
    wherein scrambling the data to be stored comprises encoding the data using the encoder to provide encoded data;
    wherein an XOR of the encoded data and the scramble codes provides the scrambled data to be stored in the storage media.

11. The system of claim 1, wherein the at least one processing device comprises:
    a first controller of a host system that uses data stored in the storage media; and
    a second controller;
    wherein the first controller is configured to send, to the second controller, write commands associated with the data to be stored.

12. The system of claim 11, wherein:
    the host system includes scramblers configured to generate scramble codes;
    the first controller is configured to send the scramble codes to the second controller; and
    the scramble codes are used to provide the scrambled data written to the storage media.

13. A method comprising:
scrambling data to be stored in a storage media;
writing the scrambled data to the storage media;
generating composite data of the scrambled data;
reading, using the composite data, the scrambled data; and
writing the scrambled data to the storage media.

14. The method of claim 13, wherein writing the scrambled data is based on reading the scrambled data written.

15. The method of claim 13, wherein using the composite data reduces a rate of read errors when reading the scrambled data written in the first programming pass.

16. The method of claim 13, further comprising using scramble codes as an input to an XOR operation to remove scramble components from the generated composite data prior to reading the scrambled data.

17. The method of claim 13, further comprising storing the generated composite data until completion of writing the scrambled data.

18. A non-transitory computer storage medium storing instructions which, when executed in a memory device, causes the memory device to perform a method, the method comprising:
scrambling received data to provide scrambled data;
writing the scrambled data;
generating scrambled composite data using the scrambled data as input;
descrambling the scrambled composite data to provide descrambled composite data;
reading, using the descrambled composite data, the scrambled data; and
writing the scrambled data obtained from the reading.

19. The non-transitory computer storage medium of claim 18, wherein the descrambling comprises using scramble codes to perform logic operations that remove scramble components from the scrambled composite data.

20. The non-transitory computer storage medium of claim 18, wherein the scrambled composite data is provided as a result from an XOR of the scrambled data.

* * * * *